United States Patent
Zhu et al.

(10) Patent No.: US 11,847,454 B1
(45) Date of Patent: Dec. 19, 2023

(54) SOLID-STATE MICROWAVE SOURCE AND BRANCH CONSISTENCY CONTROL METHOD THEREOF

(71) Applicant: Hefei Institute of Physical Science, Chinese Academy of Sciences, Anhui (CN)

(72) Inventors: Liang Zhu, Anhui (CN); Wendong Ma, Anhui (CN); Mao Wang, Anhui (CN); Chengzhou Liu, Anhui (CN); Sheng Liu, Anhui (CN); Jiafang Shan, Anhui (CN)

(73) Assignee: Hefei Institute of Physical Science, Chinese Academy of Sciences, Hefei (CN)

( * ) Notice: Subject to any disclaimer, the term of this patent is extended or adjusted under 35 U.S.C. 154(b) by 0 days.

(21) Appl. No.: 18/116,297

(22) Filed: Mar. 1, 2023

(30) Foreign Application Priority Data

Jul. 8, 2022 (CN) .......................... 202210797028.7

(51) Int. Cl.
*G06F 9/30* (2018.01)
*G06F 9/4401* (2018.01)

(52) U.S. Cl.
CPC .......... *G06F 9/3005* (2013.01); *G06F 9/4411* (2013.01)

(58) Field of Classification Search
CPC ............................. G06F 9/4411; G06F 9/3005
USPC ...................................................... 712/220
See application file for complete search history.

(56) References Cited

U.S. PATENT DOCUMENTS

| 4,327,339 A | 4/1982 | Bert |
| 5,291,148 A * | 3/1994 | Reisner ................. H03F 1/3252 |
| | | 330/149 |
| 11,283,410 B2 * | 3/2022 | Bouisse ................ H03F 1/0288 |
| 2003/0153270 A1 * | 8/2003 | Kawakami ........... H03F 1/3223 |
| | | 455/63.1 |

(Continued)

FOREIGN PATENT DOCUMENTS

| CN | 101283926 A | 10/2008 |
| CN | 106055732 A | 10/2016 |

(Continued)

OTHER PUBLICATIONS

Notice of Allowance of counterpart Chinese Patent Application No. 202210797028.7 dated Aug. 18, 2022.

(Continued)

*Primary Examiner* — Chun Kuan Lee

(57) ABSTRACT

Disclosed are a solid-state microwave source and a branch consistency control method thereof. The branch consistency control method includes: collecting phase information of each branch unit under each of a plurality of preset target powers, and performing phase adjustment for each branch unit based on the phase information under each of the target powers; assembling coarsely-adjusted N branch units, a driver module, a power distribution module, a radial combiner, a circulator, and a waveguide coupler; adjusting a branch power by using the driver module and the power distribution module, to collect the phase information of each branch unit under each of the target powers; and when the phase information of each branch unit under each of the target powers meets a preset condition, performing phase adjustment for the branch unit based on the phase information.

20 Claims, 1 Drawing Sheet

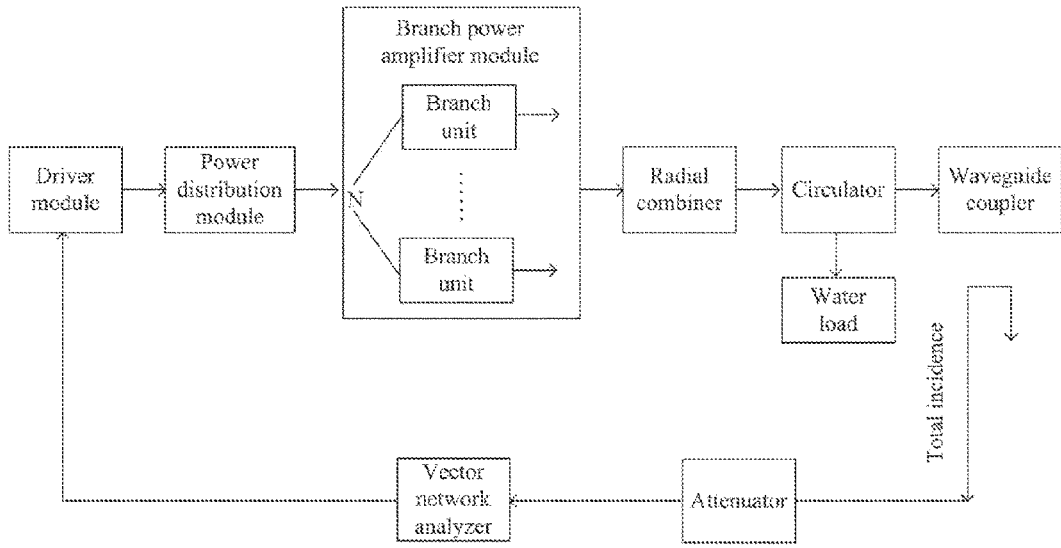

(56) References Cited

U.S. PATENT DOCUMENTS

| | | | | |
|---|---|---|---|---|
| 2014/0320376 A1* | 10/2014 | Ozdemir | ............ | H01Q 9/0442 |
| | | | | 343/876 |
| 2014/0361847 A1* | 12/2014 | Goldblatt | ............... | H03F 3/211 |
| | | | | 333/101 |
| 2016/0266052 A1 | 9/2016 | Hu et al. | | |
| 2018/0183629 A1* | 6/2018 | Pandey | ................... | H04B 1/38 |

FOREIGN PATENT DOCUMENTS

| | | |
|---|---|---|
| CN | 106455356 A | 2/2017 |
| CN | 109451619 A | 3/2019 |
| CN | 113162575 A | 7/2021 |

OTHER PUBLICATIONS

Lei Wang et al., A Millimeter-Wave Solid-State Power Combining Circuit Based on Branch-waveguide Directional Coupler, Proceedings of International Symposium on Signals, Systems and Electronics, 2010.

Guang Yang et al., A Compact High-Power Microwave Solid-State Source, Journal of Microwaves, Dec. 2020, pp. 52-56 and 60, vol. 36, No. 6.

\* cited by examiner

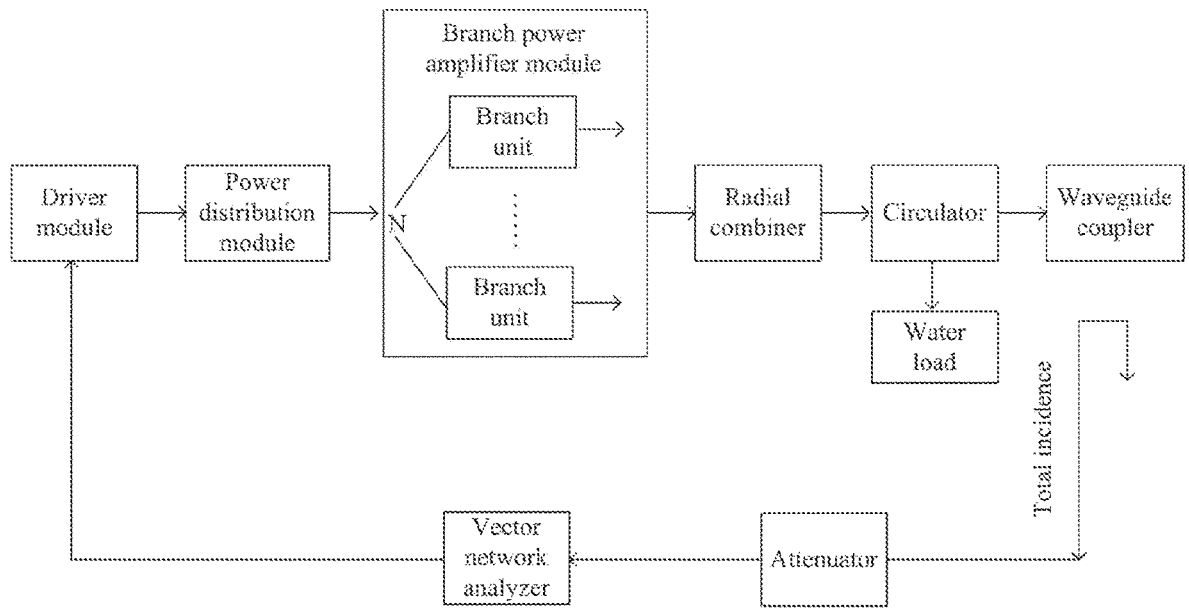

FIG. 1

Collect phase information of each branch unit under each of a plurality of preset target powers, and perform phase adjustment for each branch unit based on the phase information under each of the target powers, such that phases and gains of N branch units under a corresponding target power all meet a first threshold — S1

Assemble the coarsely-adjusted N branch units, a driver module, a power distribution module, a radial combiner, a circulator, and a waveguide coupler; adjust a branch power by using the driver module and the power distribution module, to collect the phase information of each branch unit under each of the target powers; and when the phase information of each branch unit under each of the target powers meets a preset condition, perform phase adjustment for a corresponding branch unit based on the phase information, such that the phases and the gains of the N branch units under the corresponding target power all meet a second threshold — S2

FIG. 2

SOLID-STATE MICROWAVE SOURCE AND BRANCH CONSISTENCY CONTROL METHOD THEREOF

CROSS REFERENCE TO RELATED APPLICATIONS

The present application claims the benefit of Chinese Patent Application No. 202210797028.7 filed on Jul. 8, 2022, the contents of which are incorporated herein by reference in their entirety.

TECHNICAL FIELD

The present disclosure relates to the technical field of solid-state microwave sources, and in particular, to a solid-state microwave source and a branch consistency control method thereof.

BACKGROUND

With the development of semiconductor technologies, a kilowatt-class solid-state microwave source has gradually replaced a magnetron and become a mainstream microwave energy source owing to its low operating voltage, stable output power, and flexible power and frequency adjustment.

The kilowatt-class solid-state microwave source is mainly implemented through multi-channel synthesis, so consistency between branch power amplifiers is particularly important. Due to a difference between power amplifiers, a phase difference inevitably exists between the branch power amplifiers, which is especially serious in the case of a high frequency.

A conventional solution is to add a phase adjustment module to the branch power amplifier to adjust a phase online in real time. In addition, since different phases correspond to different insertion losses, an amplitude compensation module also needs to be added accordingly. However, this solution needs to collect and monitor phase information and amplitude information of each branch power amplifier module as a whole, and dynamically perform phase and amplitude compensation for one or some branch power amplifier modules at the same time based on a real-time online determining result of an overall output power. This imposes an extremely high control requirement when there are many to-be-synthesized branches. In addition, various analog and digital signals need to be collected at a high speed, which increases a difficulty greatly and is also extremely expensive.

SUMMARY

To resolve at least one of the technical problems in the prior art, the present disclosure provides a solid-state microwave source and a branch consistency control method thereof.

According to a first aspect, the present disclosure provides a solid-state microwave source, including a driver module, a power distribution module, a branch power amplifier module, a radial combiner, a circulator, and a waveguide coupler that are connected in turn. The branch power amplifier module includes N branch units, and the N branch units each are connected to the power distribution module by using an amplitude and phase stable cable. Each of the branch units includes an independent switch, a blocking capacitor, and M series-connected driver chips, where microstrips are vertically disposed on two sides of the blocking capacitor to adjust a branch phase, the M series-connected driver chips are configured to control an insertion loss caused by phase adjustment, and both N and M are non-zero natural numbers.

As a possible implementation of the first aspect, the N branch units include electronic components of a same batch and are welded by using a same welding process.

As a possible implementation of the first aspect, $N \geq 4$.

According to a second aspect, the present disclosure further provides a branch consistency control method of a solid-state microwave source, where the branch consistency control method is applied to the solid-state microwave source described in the first aspect, and includes:

coarse adjustment steps: collecting phase information of each branch unit under each of a plurality of preset target powers, where the target powers include power points in a linear region, a saturation region, and a deep saturation region of a power amplifier; and performing phase adjustment for each branch unit based on the phase information under each of the target powers, such that phases and gains of N branch units under a corresponding target power all meet a first threshold; and fine adjustment steps: assembling the coarsely-adjusted N branch units, a driver module, a power distribution module, a radial combiner, a circulator, and a waveguide coupler; adjusting a branch power by using the driver module and the power distribution module, to collect the phase information of each branch unit under each of the target powers; and when the phase information of each branch unit under each of the target powers meets a preset condition, performing phase adjustment for a corresponding branch unit based on the phase information, such that the phases and the gains of the N branch units under the corresponding target power all meet a second threshold; where the second threshold is less than the first threshold; and the phase adjustment includes: determining a target phase of the corresponding branch unit based on the phase information under each of the target powers, and adjusting a height of a blocking capacitor in the branch unit based on the target phase.

As a possible implementation of the second aspect, the target phase is determined in a following manner: determining a mean of N pieces of phase information under a current target power; and determining phase information most approximate to the mean among the N pieces of phase information as the target phase.

As a possible implementation of the second aspect, in the fine adjustment steps, when the phase information of each branch unit under each of the target powers does not meet the preset condition, the phase adjustment further includes: changing an amplitude and phase stable cable between the power distribution module and a branch power amplifier module, such that the phases and the gains of the N branch units under the corresponding target power all meet the second threshold.

As a possible implementation of the second aspect, after the fine adjustment steps, the branch consistency control method further includes following calibration steps: sequentially connecting a coupler and a phase-locked source in series on an input terminal of the driver module; obtaining a frequency of the phase-locked source and an output frequency of the waveguide coupler; performing phase discrimination for the frequency of the phase-locked source and the output frequency of the waveguide coupler by using a phase discriminator, and outputting a phase-discriminated voltage; and performing the fine adjustment steps for the N branch units based on the phase-discriminated voltage.

As a possible implementation of the second aspect, a difference between a phase threshold of the second threshold and a phase threshold of the first threshold is 10°; and both a gain threshold of the second threshold and a gain threshold of the first threshold are 0.4 dB.

As a possible implementation of the second aspect, when the gain of each branch unit does not meet the first threshold or the second threshold, an adjustable resistor in the branch unit is adjusted to control an evanescent voltage.

As a possible implementation of the second aspect, in the fine adjustment steps, the phase information of each branch unit under each of the target powers is collected by using a vector network analyzer, where one terminal of the vector network analyzer is connected to an input terminal of the driver module, and the other terminal is connected to an input terminal of the waveguide coupler.

Compared with the prior art, the solid-state microwave source and the branch consistency control method thereof that are provided in the present disclosure at least have following beneficial effects:

In the branch consistency control method of a solid-state microwave source, when each branch unit is debugged separately through the coarse adjustment steps, a branch phase is specifically adjusted by using the added microstrip in the branch unit to reduce a probability of continuous disassembling and assembling due to a large phase difference between the branch units after final assembling, and improve efficiency. After the coarse adjustment steps are completed, the modules of the solid-state microwave source are finally assembled and then fine adjusted to further improve phase and gain consistency between the branch units. A manner of obtaining the solid-state microwave source by using the above method can greatly reduce a power synthesis difficulty.

BRIEF DESCRIPTION OF THE DRAWINGS

To describe the technical solutions in the present disclosure more clearly, the following briefly describes the accompanying drawings required for describing the implementations. Apparently, the accompanying drawings in the following description show merely some implementations of the present disclosure, and a person of ordinary skill in the art may further derive other drawings from these accompanying drawings without creative efforts.

FIG. 1 is a schematic structural diagram of a solid-state microwave source according to an embodiment of the present disclosure; and FIG. 2 is a schematic flowchart of a branch consistency control method of a solid-state microwave source according to an embodiment of the present disclosure.

DETAILED DESCRIPTION

The specific embodiments of the present disclosure will be described in detail below. The preferred embodiments of the present disclosure are shown in the accompanying drawings. The accompanying drawings are intended to supplement the description of the textual part of the specification with graphics, so as to make the technical features and overall technical solution of the present disclosure vividly understood. However, these accompanying drawings should not be understood as a limitation to the protection scope of the present disclosure.

The term "includes/comprises" used in the specification and claims shall not be construed as limiting the content listed thereafter, and does not exclude other components or steps. Therefore, "includes/comprises" when used in this specification is taken to specify the presence of mentioned features, entireties, steps or components but does not preclude the presence or addition of one or more other features, entireties, steps or components, and combinations thereof. Therefore, the expression "equipment including components A and B" should not be limited to equipment consisting only of the components A and B.

The term "one embodiment" or "an embodiment" mentioned in the specification means that a specific feature, structure or characteristic described in connection with the embodiment is included in at least one embodiment of the present disclosure. Therefore, the phrase "in an embodiment" or "in this embodiment" that appears everywhere throughout the specification does not necessarily refer to the same embodiment, but may refer to the same embodiment. In addition, in one or more embodiments, the specific features, structures or characteristics may be appropriately combined, as will be apparent to those skilled in the art from the disclosure.

A kilowatt-class high-power solid-state microwave source is gradually replacing a magnetron owing to its low operating voltage, stable output power, flexible power and frequency adjustment, and other advantages. At present, the kilowatt-class solid-state microwave source is mainly implemented through multi-channel synthesis, so consistency between branch power amplifiers is particularly important. However, due to a difference between power amplifiers, a phase difference inevitably exists between the branch power amplifiers, which is especially serious in the case of a high frequency ($\geq 1.3$ GHz).

To resolve the above problem, a conventional solution is to add a phase adjustment module to the branch power amplifier to adjust a phase online in real time. In addition, since different phases correspond to different insertion losses, an amplitude compensation module also needs to be added accordingly. Although this conventional solution can achieve good branch phase consistency, but needs to monitor and collect phase and amplitude information of each branch as a whole, and perform real-time and online determining based on an overall output power to dynamically perform phase and amplitude compensation for one or some branches at the same time. Therefore, this conventional solution is only applicable to a case in which there is only a few solid-state microwave sources to be synthesized. An extremely high control requirement is imposed when an output power of 10 KW or above needs to be obtained. In addition, various analog and digital signals need to be collected at a high speed, which increases a difficulty greatly and is also extremely expensive. Therefore, a low-cost and efficient branch consistency detection and compensation method is urgently needed at present.

Considering the above problems in the prior art, embodiments of the present disclosure, in combination with the accompanying drawings, provide a solid-state microwave source and a branch consistency control method thereof, which will be described in detail below.

According to a first aspect, an embodiment of the present disclosure provides a solid-state microwave source, including a driver module, a power distribution module, a branch power amplifier module, a radial combiner, a circulator, and a waveguide coupler that are connected in turn. The branch power amplifier module includes N branch units, and the N branch units each are connected to the power distribution module by using an amplitude and phase stable cable.

Specifically, the amplitude and phase stable cable is used to connect the power distribution module and the branch power amplifier module, and connect the branch power amplifier module and the radial combiner. The power distribution module may be a microwave power divider. In other examples, the modules in the solid-state microwave source may be connected to each other by using the amplitude and phase stable cable, to ensure consistent branch phases and gains.

In this embodiment, each of the branch units in the branch power amplifier module includes an independent switch, a blocking capacitor, and M series-connected driver chips, where microstrips are vertically disposed on two sides of the blocking capacitor to adjust a branch phase, and the M series-connected driver chips are configured to control an insertion loss caused by phase adjustment.

It can be understood that the above embodiment is based on a characteristic that a solid-state circuit is flexible and adjustable. The microstrips are vertically disposed on the two sides of the blocking capacitor respectively, such that the phase adjustment can be implemented by adjusting a length of the microstrip based on a height of the blocking capacitor. In addition, the M driver chips are connected in series to achieve deep saturation, that is, an output characteristic curve is located in a deep saturation region to offset the insertion loss caused by the phase change. An output power increases with an increase of an input power, and the output characteristic curve is located in a saturation region when the increase of the output power is nonlinear. With the increase of the input power, the output characteristic curve is located in the deep saturation region when a change of the output power is $<\pm0.3$ dB.

In this embodiment, both N and M are non-zero natural numbers. The quantity N of branch units may be set to be $\geq 4$; and M may be set to be $\geq 2$, in other words, two or more driver chips may be set.

Preferably, the N branch units, especially power amplifier chips, capacitors, isolators (namely, bridges), and other key components, are electronic components of a same batch, and are weld by using a same welding process and vacuum welding procedure, to ensure phase and gain consistency between the branch units from selection and processing of key components at the source.

In a specific embodiment, a structure of the high-power solid-state microwave source provided in the present disclosure is shown in FIG. 1.

In this embodiment, the driver module is configured to perform power amplification to ensure that a target power can be achieved for each branch unit in the branch power amplifier module after power distribution, and realize switch adjustment and gain adjustment. The driver module is composed of an RF switch, an adjustable attenuator, a driver chip, and a power amplifier chip to realize the power amplification, fast switching, and power control. The power distribution module has a same port quantity as the radial combiner, and a port of the power distribution module is generally an SMA interface or an N connector, so as to achieve power sharing and ensure consistent branch phases.

Specifically, input ports of the N branch units are SMA interfaces or N connectors, and each of the branch units is connected to the power distribution module by using a coaxial amplitude and phase stable cable.

Generally, both an input port of the radial combiner and an output port of the branch power amplifier module have a large power, and therefore are generally 7-16 RF connectors and are directly connected by using a high-power amplitude and phase stable cable.

The attenuator is configured to reduce the power. Generally, an input power of a port of a vector network analyzer is small, so a power coupled from the waveguide coupler can be fed into the port of the vector network analyzer only after being attenuated, to protect the test instrument. The circulator is configured to avoid a permanent damage to the front-end radial combiner due to an excessive reflected power. A water load is configured to absorb the reflected power. Settings of the attenuator, the circulator, and the water load all belong to the prior art, and are not described in the present disclosure.

According to a second aspect, an embodiment of the present disclosure provides a branch consistency control method of a solid-state microwave source as shown in FIG. 2, where the branch consistency control method is applied to the solid-state microwave source described in the first aspect, and includes the following steps:

S1. Coarse adjustment steps: Collect phase information of each branch unit under each of a plurality of preset target powers, where the target powers include power points in a linear region, a saturation region, and a deep saturation region of a power amplifier; and perform phase adjustment for each branch unit based on the phase information under each of the target powers, such that phases and gains of N branch units under a corresponding target power all meet a first threshold.

S2. Fine adjustment steps: Assemble the coarsely-adjusted N branch units, a driver module, a power distribution module, a radial combiner, a circulator, and a waveguide coupler; adjust a branch power by using the driver module and the power distribution module, to collect the phase information of each branch unit under each of the target powers; and when the phase information of each branch unit under each of the target powers meets a preset condition, perform phase adjustment for a corresponding branch unit based on the phase information, such that the phases and the gains of the N branch units under the corresponding target power all meet a second threshold.

In this embodiment, a phase value in the second threshold is less than that in the first threshold. The phase adjustment specifically includes: determining a target phase of the corresponding branch unit based on the phase information under each of the target powers, and adjusting a height of a blocking capacitor in the branch unit based on the target phase.

In this embodiment, before a solid-state microwave source is finally assembled, a branch power amplifier module is debugged separately through the coarse adjustment steps to reduce a probability of continuous disassembling and assembling due to a large phase difference between the branch units after the final assembling. After the final assembling, the fine adjustment steps are performed to further improve consistency of the branch power amplifier module. Compared with the prior art, the branch consistency control method of a solid-state microwave source in this embodiment of the present disclosure has a simpler overall operation procedure and a low cost.

A specific implementation process of the branch consistency control method of a solid-state microwave source will be described below by using a plurality of embodiments.

In an embodiment, the N branch units in the branch power amplifier module all are electronic components of a same batch and use a same welding process to ensure phase and gain consistency from the source.

Before formal final assembling, each branch unit needs to be debugged separately to complete the coarse adjustment steps. Specifically, a plurality of power step points in the linear region, the saturation region, and the deep saturation region of the power amplifier, such as 100 w, 200 w, 400 w, 600 w, and 800 w, are selected, and gain and phase information of the N branch units at each power step point are collected and recorded to obtain datasets of the N branch units.

It can be understood that gain and phase information of the power amplifier in the linear region and the saturation region is basically the same, so it is of little significance to collect all power data. Therefore, in this embodiment of the present disclosure, data in the linear region and the saturation region does not need to be recorded in real time, and can be covered only by recording phase and gain information under specified power step points, thereby greatly reducing a data amount and improving work efficiency.

Further, after the phase and gain data is collected and recorded, the recorded datasets are summarized and a mean is calculated. Data most approximate to the mean among N pieces of branch data is taken as the target phase, and the phase adjustment is performed for the N branch units based on the target phase to ensure that the phases and the gains of the N branch units at each power step all meet the first threshold.

Specifically, during the phase adjustment, the height of the blocking capacitor of the branch unit is adjusted to change lengths of microstrips disposed on two terminals of the blocking capacitor, thereby changing the phase of the branch unit. In addition, because the phase adjustment causes different insertion losses, which affects the gain, it is necessary to connect two or more stages of driver chips in series to achieve deep saturation to offset an impact caused by the phase adjustment to the gain.

It should be noted that in this embodiment, two driver chips may be disposed to connect to one adjustable gain chip in series, where the adjustable gain chip is set as an adjustable resistor in a circuit design, and a voltage is changed by adjusting the adjustable resistor, so as to achieve local attenuation adjustment without a need for independent external control.

Further, after the branch units are separately debugged, the debugged N branch units, the driver module, the power distribution module, the radial combiner, the circulator, and the waveguide coupler are assembled, and then the fine adjustment steps are performed.

Specifically, one terminal of a vector network analyzer may be connected to an input terminal of the driver module, and the other terminal of the vector network analyzer is connected to a general incident terminal of the waveguide coupler, and then an independent switch of a to-be-tested branch unit is turned on. At this time, independent switches of other branch units are turned off. Further, the driver module is controlled to adjust a power, such that phase and gain information of the to-be-tested branch unit under each power step point is measured in turn, and the remaining branch units are measured in a same way. Finally, measured data is summarized.

Through analysis of the summarized data, whether a phase difference between the branch units meets a preset condition can be determined. If the phase difference between the branch units meets the preset condition, the phase of each branch unit is adjusted based on the summarized data, such that the phases and gains of the N branch units at each power step all meet the second threshold.

It should be noted that the selected power step point, the phase and gain information measurement method of each branch unit, and the phase adjustment method in the fine adjustment steps are consistent with those in the coarse adjustment steps. For a specific implementation process of the fine adjustment steps, reference may be made to the relevant description of the above embodiment, and details are not described herein again.

It can be understood that branch phase and gain information measured in an assembled state is generally not as good as measurement data of a single branch unit, because there are different phase and gain differences at various ports of the combiner and dozens of amplitude and phase stable cables. For this reason, this embodiment selects the target phase based on a mean of different branch phases, and adjusts the branch phases to the target phase, to achieve consistent branch phases and gains.

Specifically, when the phase difference between the branch units does not meet the preset condition, a phase of the amplitude and phase stable cable between the power distribution module and each branch unit can be changed for phase compensation, such that the phases and the gains of the N branch units at each power step all meet the second threshold, thereby achieving phase consistency between the branch units.

In this embodiment, the phase compensation can be implemented by changing the amplitude and phase stable cable between the power distribution module and each branch unit.

For selection of the thresholds in the above embodiment, for the solid-state microwave source, if the power amplifier chip has good consistency, the gain is about ±0.5 dB. In addition, consistency between the branch phases will directly affect synthesis efficiency. Therefore, the phase difference generally needs to be controlled to be within ±10°, and the power synthesis efficiency should be ≥90%. Therefore, in this embodiment of the present disclosure, the first threshold is preferably set as follows: phase difference ≤±25°, and gain ≤0.4 dB; and the second threshold is preferably set as follows: phase difference ≤±15°, and gain ≤0.4 dB.

Correspondingly, the preset condition specified in this embodiment may be that the phase difference is ≥30°.

In another embodiment, after the coarse adjustment steps and the fine adjustment steps are completed for the branch unit, the branch unit may further be calibrated to further ensure the consistency between the branch phases.

Specifically, during the calibration, a phase-locked source is first connected to the input terminal of the driver module, and one coupler is connected in series between the driver module and the phase-locked source to perform coupling to obtain a frequency fo of the phase-locked source as a reference frequency of a phase discriminator. In addition, a frequency fn is output from an input coupling terminal of the waveguide coupler to serve as another input frequency of the phase discriminator. Finally, the phase discriminator performs phase discrimination for the frequency fo and the frequency fn, and a phase-discriminated voltage is output. Each branch unit is fine adjusted in turn based on the obtained phase-discriminated voltage to determine an accurate value of the phase adjustment, so as to further verify phase consistency information.

Finally, the coupler and the phase discriminator that are connected in series between the phase-locked source and the driver module are removed to restore an architecture of the high-power solid-state microwave source, and then the independent switch of each branch unit and a switch of the driver module are turned on in turn. In addition, the power is adjusted to a smaller value by using the driver module, combined output data is monitored, then the power is increased gradually until a full power is output, and finally power synthesis is achieved.

The branch consistency control method of a solid-state microwave source provided in the above embodiment of the present disclosure can greatly reduce a synthesis difficulty, and provide a good exploration basis for researching a kilowatt-class high-power solid-state microwave source that is still in its infancy.

The technical features of the foregoing embodiments can be employed in arbitrary combinations. For brevity of description, not all possible combinations of the technical features of the foregoing embodiments are described. However, the combinations of the technical features should be construed as falling within the scope described in this specification as long as there is no contradiction in the combinations.

The invention claimed is:

1. A solid-state microwave source comprising:
a driver module, a power distribution module, a branch power amplifier module, a radial combiner, a circulator, and a waveguide coupler that are connected in turn, wherein the branch power amplifier module comprises N branch units, and the N branch units each are connected to the power distribution module by using an amplitude and phase stable cable;
each of the branch units comprises an independent switch, a blocking capacitor, and M series-connected driver chips;
microstrips are vertically disposed on two sides of the blocking capacitor to adjust a branch phase; and
the M series-connected driver chips are configured to control an insertion loss caused by phase adjustment, wherein both N and M are non-zero natural numbers.

2. The solid-state microwave source according to claim 1, wherein the N branch units comprise electronic components of a same batch and are welded by using a same welding process.

3. The solid-state microwave source according to claim 1, wherein N≥4.

4. The solid-state microwave source according to claim 1 carrying out a branch consistency control method comprising:
coarse adjustment steps: collecting phase information of each branch unit under each of a plurality of preset target powers, wherein the target powers comprise power points in a linear region, a saturation region, and a deep saturation region of a power amplifier; and
performing phase adjustment for each branch unit based on the phase information under each of the target powers, such that phases and gains of N branch units under a corresponding target power all meet a first threshold; and
fine adjustment steps: assembling the coarsely-adjusted N branch units, a driver module, a power distribution module, a radial combiner, a circulator, and a waveguide coupler;
adjusting a branch power by using the driver module and the power distribution module, to collect the phase information of each branch unit under each of the target powers; and
when the phase information of each branch unit under each of the target powers meets a preset condition, performing phase adjustment for a corresponding branch unit based on the phase information, such that the phases and the gains of the N branch units under the corresponding target power all meet a second threshold; wherein
the second threshold is less than the first threshold; and
the phase adjustment comprises: determining a target phase of the corresponding branch unit based on the phase information under each of the target powers, and adjusting a height of a blocking capacitor in the branch unit based on the target phase.

5. The solid-state microwave source according to claim 2 carrying out a branch consistency control method comprising:
coarse adjustment steps: collecting phase information of each branch unit under each of a plurality of preset target powers, wherein the target powers comprise power points in a linear region, a saturation region, and a deep saturation region of a power amplifier; and
performing phase adjustment for each branch unit based on the phase information under each of the target powers, such that phases and gains of N branch units under a corresponding target power all meet a first threshold; and
fine adjustment steps: assembling the coarsely-adjusted N branch units, a driver module, a power distribution module, a radial combiner, a circulator, and a waveguide coupler;
adjusting a branch power by using the driver module and the power distribution module, to collect the phase information of each branch unit under each of the target powers; and
when the phase information of each branch unit under each of the target powers meets a preset condition, performing phase adjustment for a corresponding branch unit based on the phase information, such that the phases and the gains of the N branch units under the corresponding target power all meet a second threshold; wherein
the second threshold is less than the first threshold; and
the phase adjustment comprises: determining a target phase of the corresponding branch unit based on the phase information under each of the target powers, and adjusting a height of a blocking capacitor in the branch unit based on the target phase.

6. The solid-state microwave source according to claim 3 carrying out a branch consistency control method comprising:
coarse adjustment steps: collecting phase information of each branch unit under each of a plurality of preset target powers, wherein the target powers comprise power points in a linear region, a saturation region, and a deep saturation region of a power amplifier; and
performing phase adjustment for each branch unit based on the phase information under each of the target powers, such that phases and gains of N branch units under a corresponding target power all meet a first threshold; and
fine adjustment steps: assembling the coarsely-adjusted N branch units, a driver module, a power distribution module, a radial combiner, a circulator, and a waveguide coupler;
adjusting a branch power by using the driver module and the power distribution module, to collect the phase information of each branch unit under each of the target powers; and
when the phase information of each branch unit under each of the target powers meets a preset condition, performing phase adjustment for a corresponding branch unit based on the phase information, such that the phases and the gains of the N branch units under the corresponding target power all meet a second threshold; wherein the second threshold is less than the first threshold; and the phase adjustment comprises: determining a target phase of the corresponding branch unit based on the phase information under each of the target powers, and adjusting a height of a blocking capacitor in the branch unit based on the target phase.

7. The branch consistency control method of a solid-state microwave source according to claim 4, wherein the target phase is determined in a following manner determining a mean of N pieces of phase information under a current target power; and determining phase information most approximate to the mean among the N pieces of phase information as the target phase.

8. The branch consistency control method of a solid-state microwave source according to claim 5, wherein the target phase is determined in a following manner determining a mean of N pieces of phase information under a current target power; and determining phase information most approximate to the mean among the N pieces of phase information as the target phase.

9. The branch consistency control method of a solid-state microwave source according to claim 6, wherein the target phase is determined in a following manner determining a mean of N pieces of phase information under a current target power; and determining phase information most approximate to the mean among the N pieces of phase information as the target phase.

10. The branch consistency control method of a solid-state microwave source according to claim 4, wherein in the fine adjustment steps, when the phase information of each branch unit under each of the target powers does not meet the preset condition, the phase adjustment further comprises:

changing an amplitude and phase stable cable between the power distribution module and a branch power amplifier module, such that the phases and the gains of the N branch units under the corresponding target power all meet the second threshold.

11. The branch consistency control method of a solid-state microwave source according to claim 5, wherein in the fine adjustment steps, when the phase information of each branch unit under each of the target powers does not meet the preset condition, the phase adjustment further comprises:

changing an amplitude and phase stable cable between the power distribution module and a branch power amplifier module, such that the phases and the gains of the N branch units under the corresponding target power all meet the second threshold.

12. The branch consistency control method of a solid-state microwave source according to claim 6, wherein in the fine adjustment steps, when the phase information of each branch unit under each of the target powers does not meet the preset condition, the phase adjustment further comprises:

changing an amplitude and phase stable cable between the power distribution module and a branch power amplifier module, such that the phases and the gains of the N branch units under the corresponding target power all meet the second threshold.

13. The branch consistency control method of a solid-state microwave source according to claim 4, wherein after the fine adjustment steps, the branch consistency control method further comprises following calibration steps:

sequentially connecting a coupler and a phase-locked source in series on an input terminal of the driver module;

obtaining a frequency of the phase-locked source and an output frequency of the waveguide coupler;

performing phase discrimination for the frequency of the phase-locked source and the output frequency of the waveguide coupler by using a phase discriminator, and outputting a phase-discriminated voltage; and performing the fine adjustment steps for the N branch units based on the phase-discriminated voltage.

14. The branch consistency control method of a solid-state microwave source according to claim 5, wherein after the fine adjustment steps, the branch consistency control method further comprises following calibration steps:

sequentially connecting a coupler and a phase-locked source in series on an input terminal of the driver module;

obtaining a frequency of the phase-locked source and an output frequency of the waveguide coupler;

performing phase discrimination for the frequency of the phase-locked source and the output frequency of the waveguide coupler by using a phase discriminator, and outputting a phase-discriminated voltage; and performing the fine adjustment steps for the N branch units based on the phase-discriminated voltage.

15. The branch consistency control method of a solid-state microwave source according to claim 6, wherein after the fine adjustment steps, the branch consistency control method further comprises following calibration steps:

sequentially connecting a coupler and a phase-locked source in series on an input terminal of the driver module;

obtaining a frequency of the phase-locked source and an output frequency of the waveguide coupler;

performing phase discrimination for the frequency of the phase-locked source and the output frequency of the waveguide coupler by using a phase discriminator, and outputting a phase-discriminated voltage; and performing the fine adjustment steps for the N branch units based on the phase-discriminated voltage.

16. The branch consistency control method of a solid-state microwave source according to claim 4, wherein a difference between a phase threshold of the second threshold and a phase threshold of the first threshold is 10°; and both a gain threshold of the second threshold and a gain threshold of the first threshold are 0.4 dB.

17. The branch consistency control method of a solid-state microwave source according to claim 4, further comprising:

when the gain of the branch unit does not meet the first threshold or the second threshold, adjusting an adjustable resistor in the branch unit to control an evanescent voltage.

18. The branch consistency control method of a solid-state microwave source according to claim 5, further comprising:

when the gain of the branch unit does not meet the first threshold or the second threshold, adjusting an adjustable resistor in the branch unit to control an evanescent voltage.

19. The branch consistency control method of a solid-state microwave source according to claim 6, further comprising:

when the gain of the branch unit does not meet the first threshold or the second threshold, adjusting an adjustable resistor in the branch unit to control an evanescent voltage.

20. The branch consistency control method of a solid-state microwave source according to claim 4, wherein in the fine adjustment steps:

the phase information of each branch unit under each of the target powers is collected by using a vector network analyzer, wherein one terminal of the vector network analyzer is connected to an input terminal of the driver module, and the other terminal is connected to an input terminal of the waveguide coupler.

\* \* \* \* \*